United States Patent
Kang et al.

(10) Patent No.: US 8,717,414 B2
(45) Date of Patent: May 6, 2014

(54) METHOD AND APPARATUS FOR MATCHING COLOR IMAGE AND DEPTH IMAGE

(75) Inventors: Byong-min Kang, Yongin-si (KR); Hwa-sup Lim, Hwaseong-si (KR); Jae-Young Sim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 565 days.

(21) Appl. No.: 12/285,246

(22) Filed: Sep. 30, 2008

(65) Prior Publication Data

US 2009/0201384 A1  Aug. 13, 2009

(30) Foreign Application Priority Data

Feb. 13, 2008 (KR) .................. 10-2008-0013003

(51) Int. Cl.
*H04N 15/00* (2006.01)
*H04N 13/00* (2006.01)
*H04N 5/232* (2006.01)

(52) U.S. Cl.
USPC ........................................ 348/42; 348/211.1

(58) Field of Classification Search
USPC ........... 348/222.1, 211.11, 262, 239, 47, 153, 348/159, 42, 60, 48; 396/325; 382/154; 345/419, 653, 664
See application file for complete search history.

(56) References Cited

U.S. PATENT DOCUMENTS 6,009,359 A *  12/1999  El-Hakim et al. ............. 701/28
6,084,979 A *  7/2000  Kanade et al. ................ 382/154
6,389,153 B1 *  5/2002  Imai et al. ..................... 382/106
6,556,704 B1 *  4/2003  Chen .............................. 382/154
6,823,080 B2 *  11/2004  Iijima et al. ................... 382/154
6,950,121 B2 *  9/2005  Tserkovnyuk et al. ......... 348/47
7,013,040 B2 *  3/2006  Shiratani ...................... 382/154
7,444,013 B2 *  10/2008  Chen ............................. 382/154
7,456,874 B1 *  11/2008  Ono .............................. 348/239
7,573,489 B2 *  8/2009  Davidson et al. ............. 345/646
7,724,378 B2 *  5/2010  Babayoff ...................... 356/601

(Continued)

FOREIGN PATENT DOCUMENTS

JP  11-85984  3/1999
JP  2003-6619  1/2003

(Continued)

OTHER PUBLICATIONS

Notice of Non-Final Rejection dated Jan. 29, 2014, from Korean Patent Application No. 10-2008-0013003 (7 pages).

*Primary Examiner* — Roberto Velez
*Assistant Examiner* — Stephen Coleman
(74) *Attorney, Agent, or Firm* — Staas & Halsey LLP (57) ABSTRACT

A method and apparatus for matching images are provided. The image matching method includes: obtaining a depth image and an intensity image of an object using a depth camera installed at a first position and a color image of the object using a color camera installed at a second position other than the first position; transforming the obtained depth image and intensity image into a depth image and an intensity image, respectively, that could be obtained if the object were photographed by a camera at the second position; and matching the transformed depth image and intensity image and the obtained color image. In this way, a depth image and intensity image obtained separately from a 2-dimensional (2D) color image can be accurately matched to the 2D color image, thereby allowing a reliable 3D image to be obtained.

13 Claims, 10 Drawing Sheets

(56) References Cited

U.S. PATENT DOCUMENTS

| | | | |
|---|---|---|---|
| 2003/0007680 A1* | 1/2003 | Iijima et al. | 382/154 |
| 2003/0012277 A1* | 1/2003 | Azuma et al. | 375/240.08 |
| 2003/0072483 A1* | 4/2003 | Chen | 382/154 |
| 2004/0212725 A1* | 10/2004 | Raskar | 348/370 |
| 2005/0086000 A1* | 4/2005 | Tsuchiya et al. | 701/211 |
| 2005/0180636 A1* | 8/2005 | Iizuka | 382/217 |
| 2006/0001739 A1* | 1/2006 | Babayoff | 348/49 |
| 2006/0007301 A1* | 1/2006 | Cho et al. | 348/51 |
| 2006/0244746 A1* | 11/2006 | England et al. | 345/419 |
| 2007/0024614 A1* | 2/2007 | Tam et al. | 345/419 |
| 2007/0098290 A1* | 5/2007 | Wells | 382/254 |
| 2007/0098300 A1* | 5/2007 | Komiya et al. | 382/284 |
| 2007/0201859 A1* | 8/2007 | Sarrat | 396/322 |
| 2007/0269103 A1* | 11/2007 | Snow et al. | 382/154 |
| 2007/0279415 A1* | 12/2007 | Sullivan et al. | 345/427 |
| 2008/0056609 A1* | 3/2008 | Rouge | 382/278 |
| 2009/0067707 A1* | 3/2009 | Sim et al. | 382/154 |
| 2009/0315982 A1* | 12/2009 | Schmidt et al. | 348/47 |

FOREIGN PATENT DOCUMENTS

| | | |
|---|---|---|
| JP | 2004-13869 | 1/2004 |
| JP | 2005-228134 | 8/2005 |
| KR | 10-2005-0058085 | 6/2005 |
| KR | 10-2006-0063558 | 6/2006 |

* cited by examiner

| X COORDINATE | DEPTH[m] |
|---|---|
| 67 | 0.91 |
| 68 | 0.91 |
| 69 | 0.91 |
| 70 | 0.91 |
| 71 | 0.78 |
| 72 | 0.78 |
| 73 | 0.78 |
| 74 | 0.78 |
| 75 | 0.78 |
| 76 | 0.78 |
| 77 | 0.78 |
| 78 | 0.78 |

FIG. 5B

| X COORDINATE | DEPTH[m] |
|---|---|
| 53.81319 | 0.91 |
| 54.81319 | 0.91 |
| 55.81319 | 0.91 |
| 56.81319 | 0.91 |
| 55.61538 | 0.78 |
| 56.61538 | 0.78 |
| 57.61538 | 0.78 |
| 58.61538 | 0.78 |
| 59.61538 | 0.78 |
| 60.61538 | 0.78 |
| 61.61538 | 0.78 |
| 62.61538 | 0.78 |

METHOD AND APPARATUS FOR MATCHING COLOR IMAGE AND DEPTH IMAGE

CROSS-REFERENCE TO RELATED APPLICATIONS

This application claims the benefit of Korean Patent Application No. 10-2008-0013003, filed on Feb. 13, 2008, in the Korean Intellectual Property Office, the disclosure of which is incorporated herein in its entirety by reference.

BACKGROUND OF THE INVENTION

1. Field

One or more embodiments of the present invention relates to a method and apparatus for matching images, and more particularly, to a method and apparatus for matching a depth image and a 2-dimensional (2D) color image.

2. Description of the Related Art

In an ordinary home-use camera (hereinafter referred to as a CCD/CMOS camera) employing a charge-coupled device (CCD) or a complementary metal oxide semiconductor (CMOS), if a photographing button disposed on the CCD/CMOS camera is manipulated, a visible ray that reflected from an object receiving sun light or flash light is sensed, thereby obtaining a 2D color image of the object.

Also, in a depth camera, if a photographing button disposed on the depth camera is manipulated; a ray that reflected from an object when a laser beam or infrared light is emitted to the object is obtained, thereby obtaining a depth image of the object. In this case, the depth means the distance from the depth camera. By thus using the obtained 2D color image and the depth image, a 3D image of the object can be obtained.

SUMMARY

Additional aspects and/or advantages will be set forth in part in the description which follows and, in part, will be apparent from the description, or may be learned by practice of the invention.

One or more embodiments of the present invention provides an image matching method and apparatus by which a depth image and an intensity image obtained separately from a 2-dimensional (2D) color image can be accurately matched to the 2D color image, thereby allowing a reliable 3D image to be obtained.

One or more embodiments of the present invention also provides a computer readable recording medium having embodied thereon a computer program for executing the method.

According to an aspect of the present invention, there is provided an image matching method including: obtaining a depth image and an intensity image of an object using a depth camera installed at a first position and a color image of the object using a color camera installed at a second position other than the first position; transforming the obtained depth image and intensity image into a depth image and an intensity image, respectively, that could be obtained if the object were photographed by a camera at the second position; and matching the transformed depth image and intensity image and the obtained color image.

According to still another aspect of the present invention, there is provided a computer readable recording medium having embodied thereon a computer program for executing the methods.

According to another aspect of the present invention, there is provided an image matching apparatus including: a depth camera installed at a first position so as to obtain a depth image and an intensity image of an object; a color camera installed at a second position other than the first position so as to obtain a color image of the object; an image transform unit transforming the obtained depth image and intensity image into a depth image and intensity image, respectively, that could be obtained if the object were photographed by a camera at the second position; and an image matching unit matching the transformed depth image and intensity image and the obtained color image.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments, examples of which are illustrated in the accompanying drawings, wherein like reference numerals refer to the like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 1:
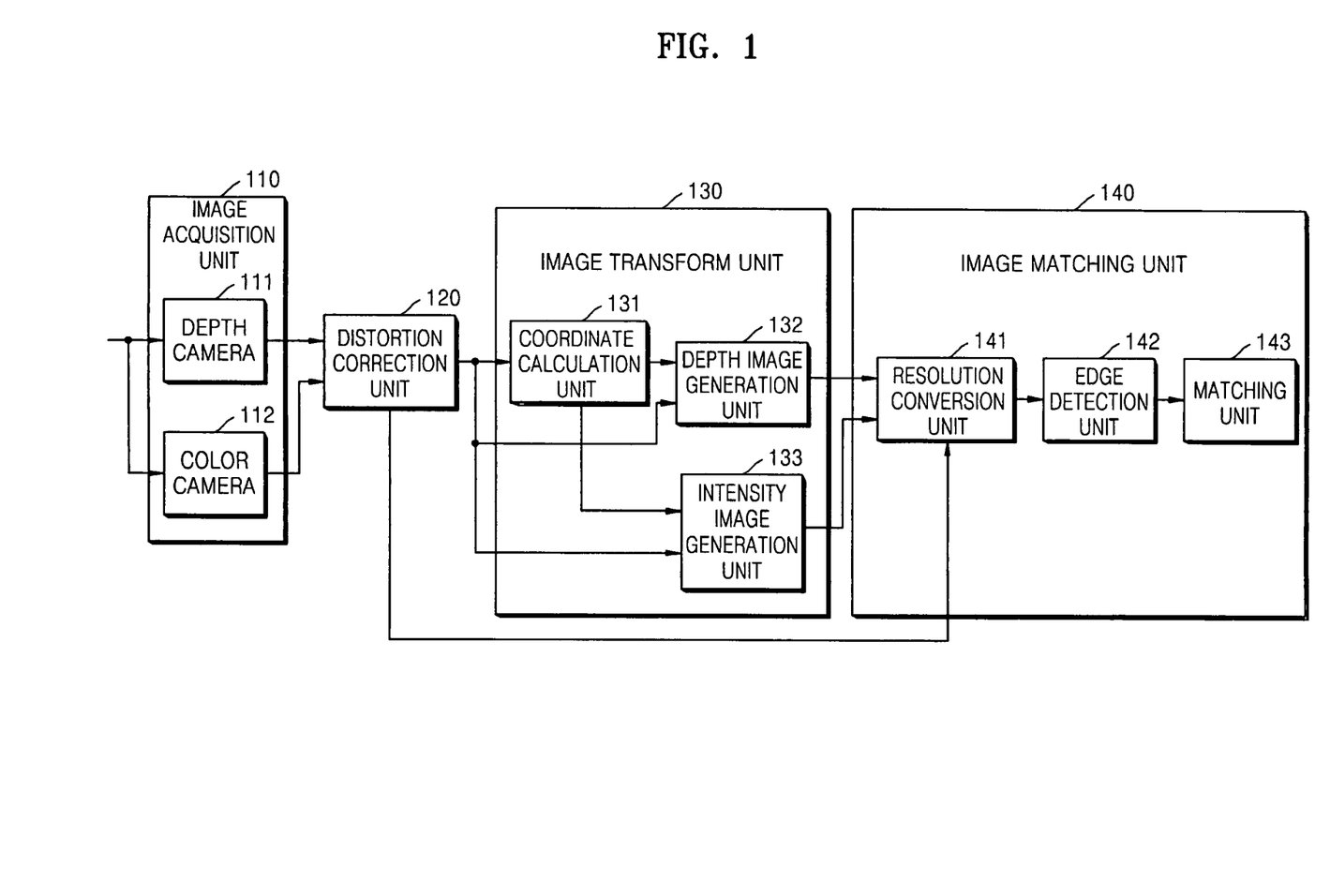
FIG. 1 is a block diagram illustrating a structure of an image matching apparatus according to an embodiment of the present invention.

FIG. 1 is a block diagram illustrating a structure of an image matching apparatus according to an embodiment of the present invention.

Referring to FIG. 1, the image matching apparatus according to the current embodiment is formed with an image acquisition unit 110, a distortion correction unit 120, an image transform unit 130, and an image matching unit 140. The image acquisition unit 110 includes a depth camera 111 and a color camera 112. The image transform unit 130 includes a coordinate calculation unit 131, a depth image generation unit 132, and a intensity image generation unit 133. The image matching unit 140 includes a resolution conversion unit 141, an edge detection unit 142, and a matching unit 143.

The image acquisition unit 110 obtains a depth image and an intensity image of an object, by using the depth camera 111, and a color image of the object, by using the color camera 112. In particular, the image acquisition unit 110 is formed with the depth camera 111 installed at a first position, and the color camera 112 installed at a second position other than the first position. The depth camera 111 and the color camera 112 face an object, from different positions, thereby obtaining a depth image, an intensity image, and a color image.

The depth camera 111 installed at the first position, if a photographing button disposed on the depth camera 111 is manipulated, emits an infrared ray onto the object. Then, by using a time period between a time when the infrared ray is emitted and a time when the infrared ray reflected by each point of the object is sensed, the depth camera 111 calculates the depth of the points of the object, expresses the calculated depth as an image, and thus a depth image of the object is obtained. In this case, the depth means the distance from the depth camera 111 to the object.

Also, if the photographing button disposed on the depth camera 111 is manipulated, the depth camera 111 emits an infrared ray onto the object, and by sensing the strength of the infrared ray reflected by each point of the object, an intensity image of the object is obtained. In particular, when the depth camera 111 obtains the depth image of the object, the depth camera 111 obtains the intensity image corresponding to the depth image.

Meanwhile, the color camera 112, installed at the second position, employs a charge-coupled device CCD or a complementary metal oxide semiconductor CMOS, and if a photographing button disposed on the color camera 112 is manipulated, the color camera 112 senses a visible ray reflected from the object receiving sun light or flash light, thereby obtaining a 2D color image of the object.

Also, in the current embodiment, the depth camera 111 and the color camera 112 are fixed such that the depth camera 111 and the color camera 112 form a straight line on a horizontal axis or a vertical axis. In particular, the current embodiment will be explained focusing on a case where the lens of the depth camera 111 and the lens of the color camera 112 form a straight line in the vertical direction, along which the depth camera 111 is positioned above the color camera 112. In another example, the depth camera 111 may be positioned below the color camera 112 or the depth camera 111 and the color camera 112 may form a horizontal straight line.

Figure 2A:
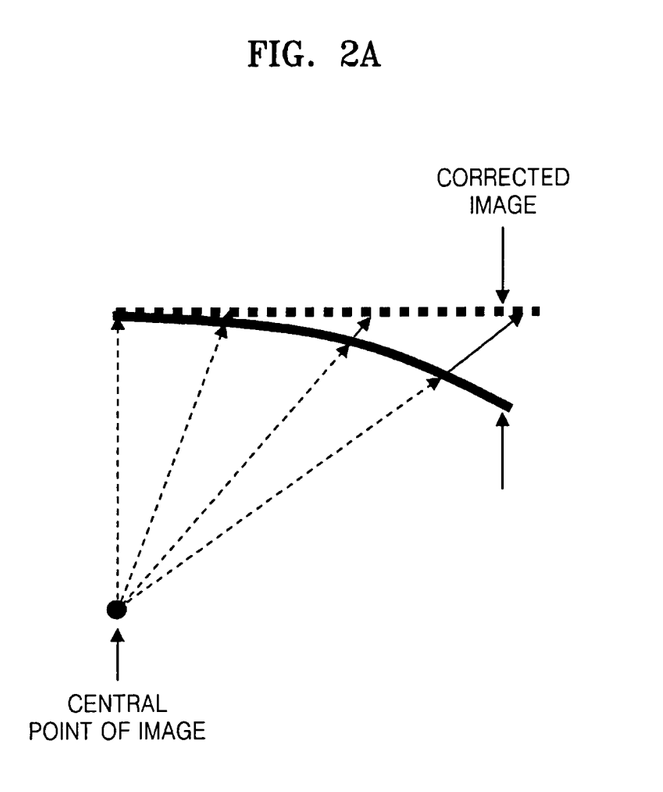
FIG. 2A is a diagram illustrating distortion correction of an image by a distortion correction unit of the image matching apparatus illustrated in FIG. 1, according to an embodiment of the present invention.
Figure 2B:
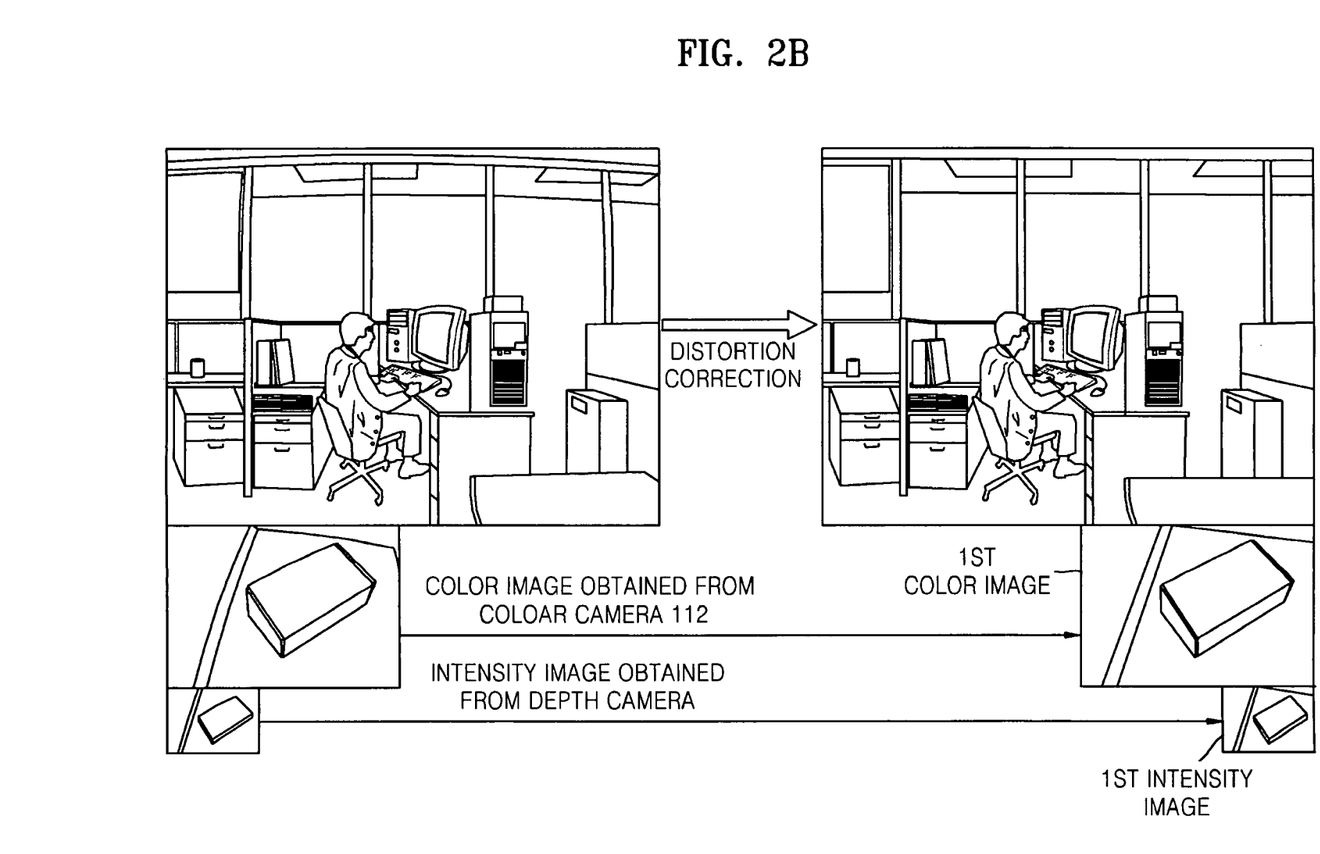
FIG. 2B is a diagram illustrating an example in which distortion of an image is corrected by the distortion correction unit of the image matching apparatus illustrated in FIG. 1, according to an embodiment of the present invention.

The distortion correction unit 120 removes lens distortion existing in a depth image obtained by the depth camera 111, thereby correcting the depth image, and removes lens distortion existing in an intensity image obtained by the depth camera 111, thereby correcting the intensity image. The distortion correction unit 120 also removes lens distortion existing in a color image obtained by the color camera 112, thereby correcting the color image. In this case, the lens distortion is distortion existing in the obtained images, and indicates distortion caused by lenses disposed on cameras. For example, the distortion correction unit 120 calculates the distance of each pixel of an obtained image, from a central pixel, as illustrated in FIG. 2A, and by moving the value of the pixel according to the calculated distance, the distortion correction unit 120 can perform correction of the image. According to this method, the distortion correction unit 120 can correct an image which is distorted in a radial shape, as illustrated in FIG. 2B. Hereinafter, a depth image, an intensity image and a color image, which are obtained after distortion is corrected by the distortion correction unit 120, will be referred to as a first depth image, a first intensity image, and a first color image, respectively.

The image transform unit 130 transforms the first depth image, which is a depth image in which distortion is corrected, into a depth image which could be obtained if the object were photographed by the depth camera 111 at the second position, which is the same position as that of the color camera 112. Also, the image transform unit 130 transforms the first intensity image, which is an intensity image in which distortion is corrected, into an intensity image which could be obtained if the object were photographed by the depth camera 111 at the second position, which is the same position as that of the color camera 112. Hereinafter, the depth image and the intensity image transformed by the image transform unit 130 will be referred to as a second depth image and a second intensity image, respectively.

Figure 3:
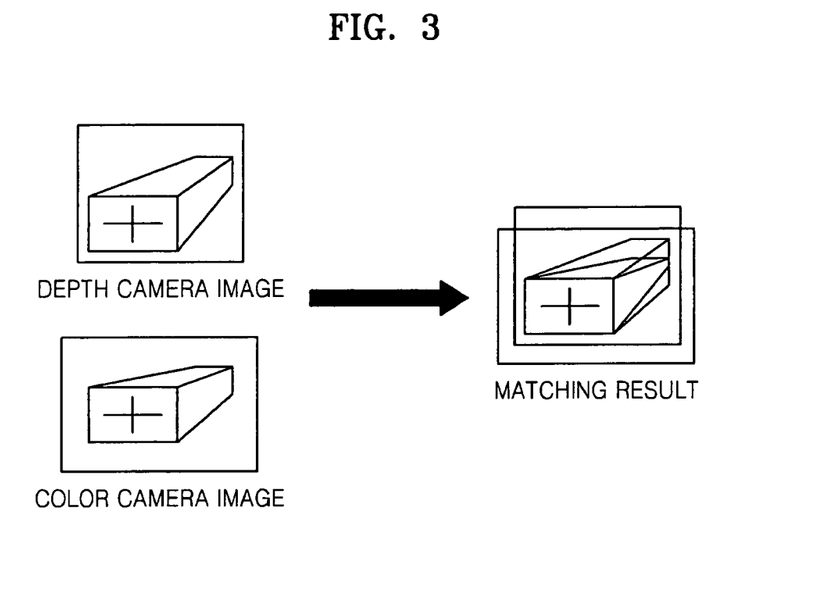
FIG. 3 is a diagram explaining why an image transform unit of the image matching apparatus illustrated in FIG. 1 needs to transform an image, according to an embodiment of the present invention.

Since the depth camera 111 obtains an image by facing the object at a different position and angle from those of the color camera 112, if the image obtained by the depth camera 111 is directly matched to an image obtained by the color camera 112, an undesirable image could be obtained. In order to solve this problem, the image transform unit 130 transforms the depth image and the intensity image obtained by the depth camera 111 positioned at the first position, into the depth image and intensity image, respectively, that could be obtained if the depth camera 111 were positioned at the second position, which is the position of the color camera 112. This image transform unit 130 is formed with the coordinate calculation unit 131, the depth image generation unit 132, and the intensity image generation unit 133.

From the coordinates of each of the pixels forming the first depth image, the coordinate calculation unit 131 calculates the coordinates of each of the pixels forming a depth image that could be obtained if the object were photographed by the depth camera 111 at the second position. In this case, the coordinates of the pixels forming the first depth image correspond to the coordinates of the pixels calculated by the coordinate calculation unit 131.

Figure 4:
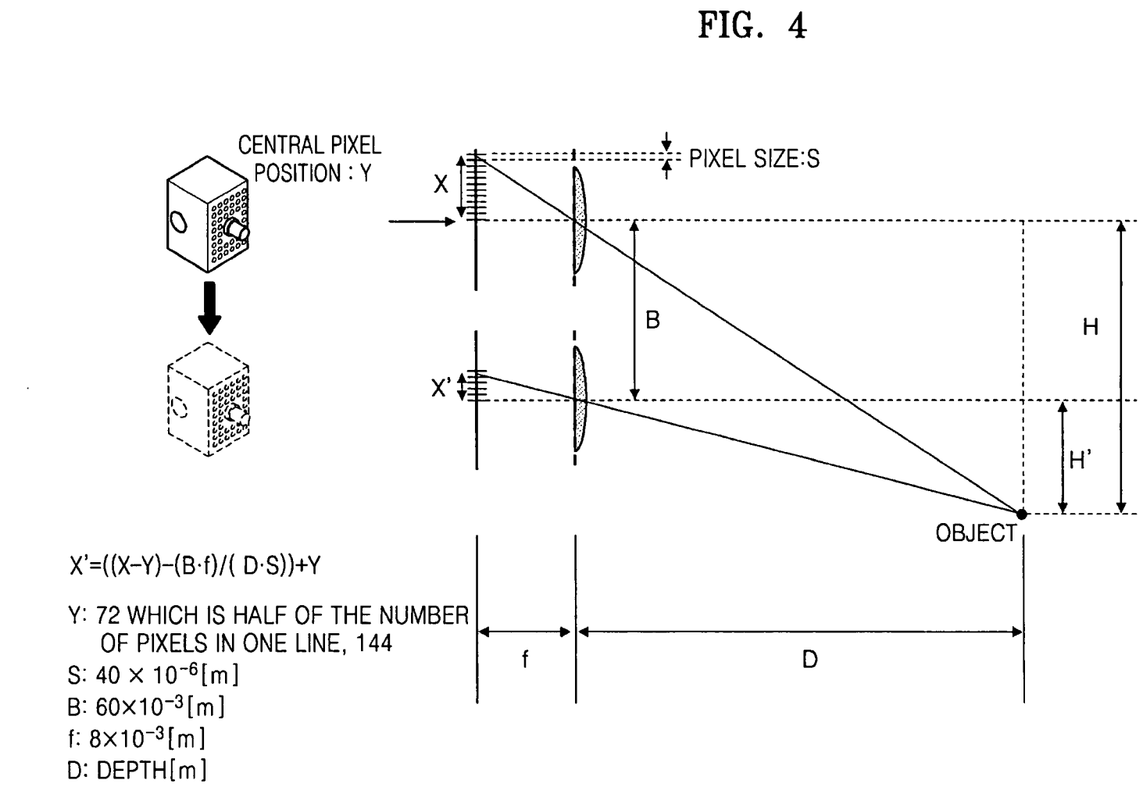
FIG. 4 is a diagram explaining a process in which a coordinate calculation unit of the image matching apparatus illustrated in FIG. 1 calculates coordinates, according to an embodiment of the present invention.

For example, it is assumed that, as illustrated in FIG. 4, the focal length of the depth camera 111 is f, the depth of any one point of the object is D, the distance between the center of the depth camera 111 and the center of the color camera 112 is B, the pixel coordinates of the point of the object in the depth camera 111 is X, the pixel coordinates of the point of the object in the color camera 112 is X', the coordinate value of a central pixel is Y, the size of one pixel is S, the distance in the vertical direction from the center of the depth camera 111 to the one point is H, and the distance in the horizontal direction from the center of the color camera 112 to the one point is H'. Then, there exist proportional equations as below:

$$(X-Y) \times S : f = H : D$$

$$(X'-Y) \times S : f = H' : D$$

Also, since H'=H−B, by using these three equations, an equation as below can be derived:

$$(X'-Y) \times D \times S = (X-Y) \times D \times S - (B \times f)$$

Accordingly, there exists Equations 1 and 2 as below:

$$X'-Y = \{(X-Y) - (B \times f)/(D \times S)\} \quad (1)$$

$$X' = \{(X-Y) - (B \times f)/(D \times S)\} + Y \ldots (2) \quad (2)$$

For example, it is assumed that
the focal length f of the depth camera 111=8×10⁻³ m,
the distance B between the depth camera 111 and the color camera 112=60×10⁻³ m, the size S of one pixel=40×10⁻⁶ m, and the coordinate value Y of the center pixel=72.

Figure 5A:
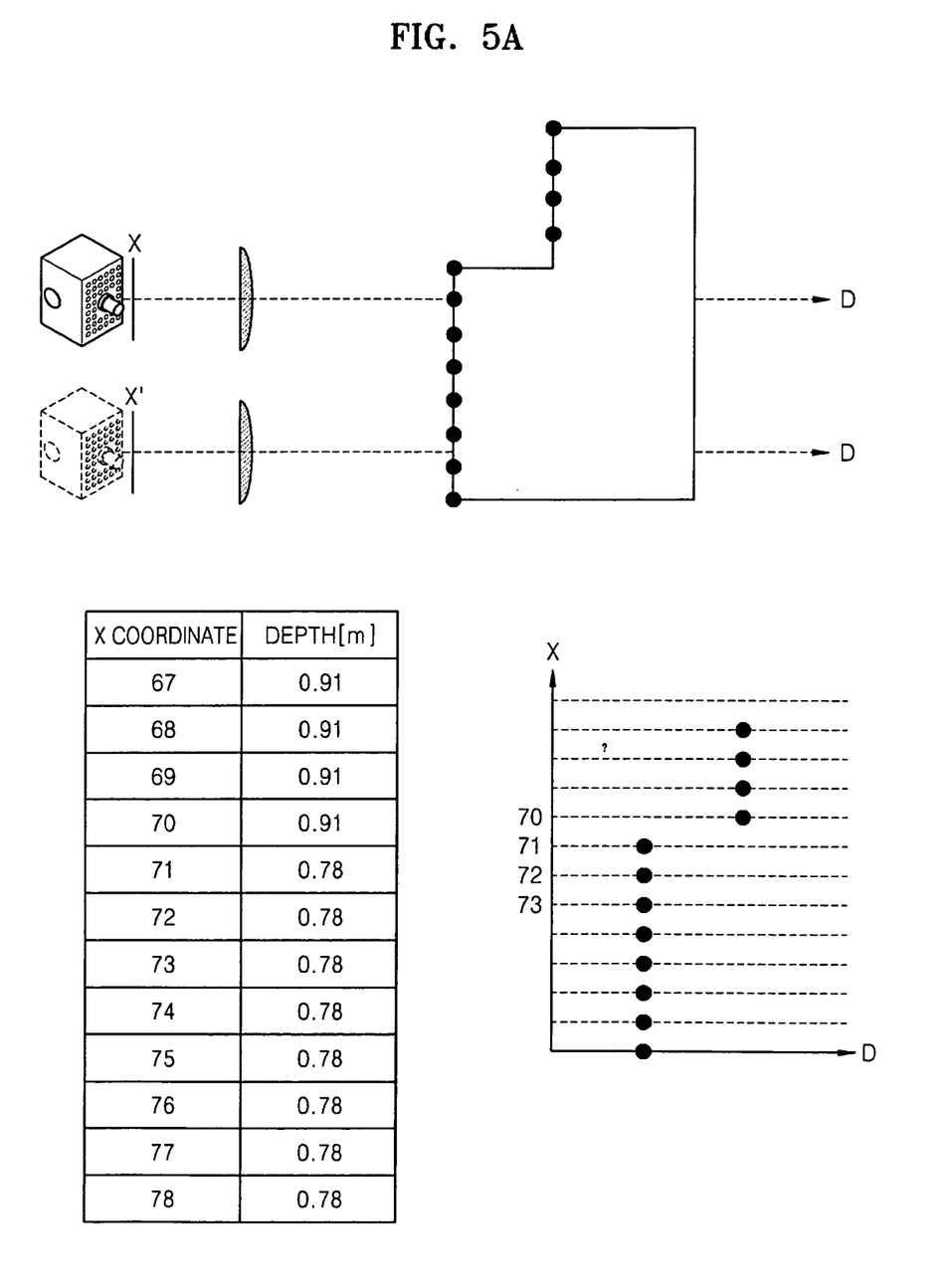
FIG. 5A is diagram illustrating the depth of an object with respect to the image matching apparatus illustrated in FIG. 1, according to an embodiment of the present invention.
Figure 5B:
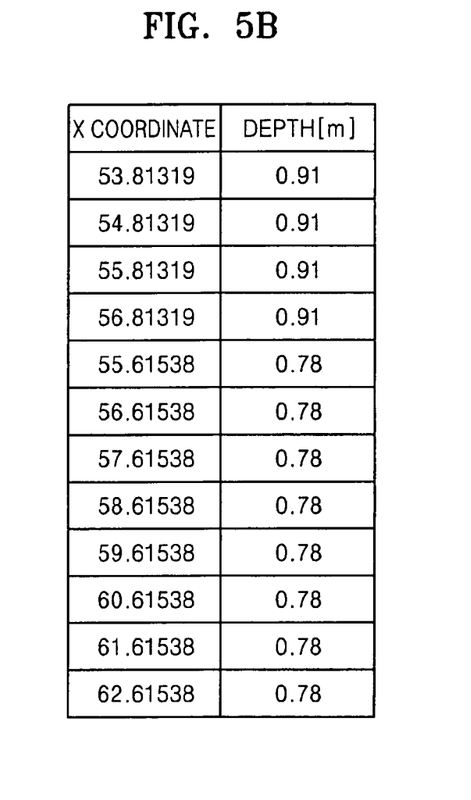
FIG. 5B is a table illustrating examples of coordinates calculated in the coordinate calculation unit of the image matching apparatus illustrated in FIG. 1, according to an embodiment of the present invention.

Also, it is assumed that, according to the relationship between the pixel coordinate value X of the one point of the object in the depth camera 111 and the depth D of the one point of the object, as illustrated in FIG. 5A, the depth is 0.91 m when X is in a range from 67 to 70, and the depth is 0.78 m when X is in a range from 71 to 78. Then, by using Equation (2) described above, the coordinate calculation unit 131 calculates the pixel coordinate X' of the one point of the object at the position of the color camera 112. Then, the calculated results are obtained as illustrated in FIG. 5B.

The depth image generation unit 132 calculates a depth value corresponding to each pixel having integer coordinates, by using the coordinates calculated by the coordinate calculation unit 131, and generates a second depth image, which is a depth image, based on this calculated depth value. Since the coordinates calculated by the coordinate calculation unit 131 are obtained through Equation 2, the coordinates generally have real number values that are not integers as X' illustrated in FIG. 5B, and thus cannot correspond to pixels forming the depth image. Accordingly, the depth image generation unit 132 calculates depth values corresponding to integer coordinates from the coordinates calculated by the coordinate calculation unit 131, and the depth values according to the calculated coordinates. In this case, the depth image generation unit 132 can use an interpolation method by which the depth values of coordinates closest to respective integer coordinates from among the coordinates calculated by the coordinate calculation unit 131 are taken as depth values corresponding to the integer coordinates. Also, the depth image generation unit 132 may use a linear interpolation method as the method of calculating the depth values corresponding to the integer values.

Figure 6A:
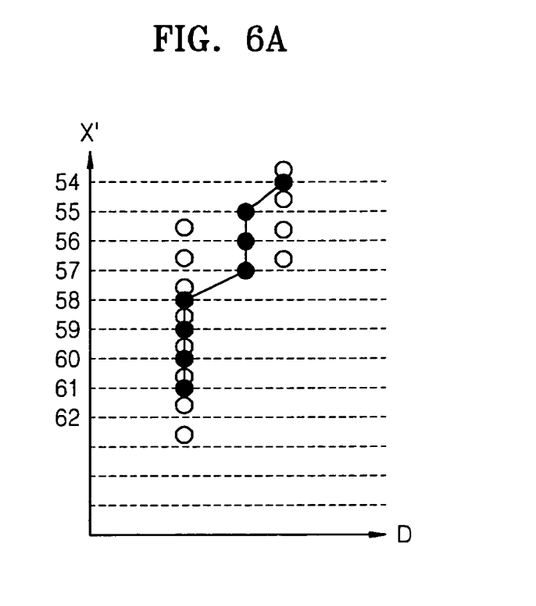
FIG. 6A is a diagram illustrating an example in which a depth image generation unit of the image matching apparatus illustrated in FIG. 1 calculates depth values by using all coordinates.

FIG. 6A is a diagram illustrating an example in which the depth image generation unit 132 calculates depth values corresponding to respective integer values, by using the linear interpolation method. In FIG. 6A, 'o' indicates a coordinate and depth before interpolation, and '•' indicates a coordinate and depth after interpolation. In this case, when X' is 53.81319, the depth value is 0.91 m and when X' is 54.81319, the depth value at coordinate 54 is obtained by using linear interpolation with the depth value of 0.91 m. Also, when X' is 54.81319, the depth value is 0.91 m and when X' is 55.61538, the depth value at coordinate 55 is obtained by using linear interpolation with the depth value of 0.78 m. When X' is 55.81319, the depth value is 0.91 m and when X' is 56.61538, the depth value at coordinate 56 is obtained by using linear interpolation with the depth value of 0.78 m. When X' is 56.81319, the depth value is 0.91 m and when X' is 57.61538, the depth value at coordinate 57 is obtained by using linear interpolation with the depth value of 0.78 m. When X' is 57.61539, the depth value is 0.78 m and when X' is 58.61538, the depth value at coordinate 58 is obtained by using linear interpolation with the depth value of 0.78 m.

However, if the second depth image is thus obtained by the depth image generation unit 132 by using all coordinates calculated by the coordinate calculation unit 131, distortion may occur in the vicinity of coordinates 55, 56 and 57 where the depth values of the object change in the depth image, as illustrated in FIG. 6A. This is because the coordinate values according to the calculation results of Expression (2) by the coordinate calculation unit 131 become less than the coordinate values of the pixels forming the first depth image, and in particular, in a deeper point of the object, the coordinate values according to the calculation results of Expression (2) decrease less.

In other words, the distance B between the depth camera 111 and the color camera 112, the focal length f of the depth camera 111, and the size S of one pixel are constant, and the difference (X−Y)−(X'−Y) between the coordinates of the pixels forming the first depth image and the coordinates of the pixels calculated by the coordinate calculation unit 131 are the same as (B×f)/(D×S) according to Expression (2). Accordingly, the difference (X−Y)−(X'−Y) between the coordinates of the pixels forming the first depth image and the coordinates of the pixels calculated by the coordinate calculation unit 131 is in inverse proportion to the depth D of any one point of the object. That is, in a deeper point of the object, the difference between the coordinates of the pixels forming the first depth image and the coordinates of the pixels calculated by the coordinate calculation unit 131 becomes smaller. That is, the deeper the position of a point of the object, the smaller each coordinate calculated by the coordinate calculation unit 131 becomes. Because of this, if the depth image generation unit 132 calculates the depth value by using all the coordinates calculated by the coordinate calculation unit 131, a distortion of the depth image as illustrated in FIG. 6A can occur.

Figure 6B:
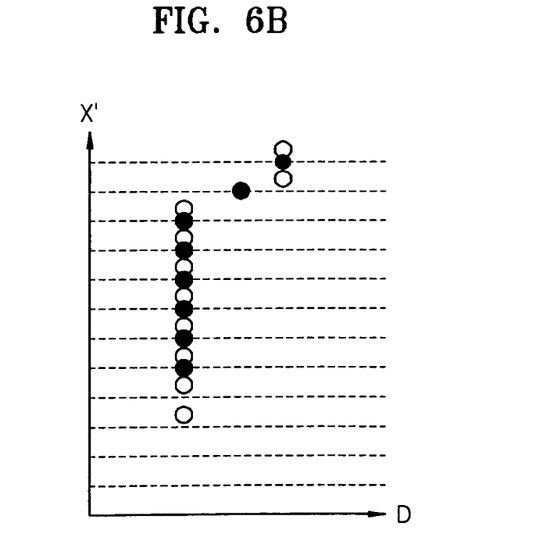
FIG. 6B illustrates an example in which the depth image generation unit removes predetermined coordinates and calculates depth values, according to an embodiment of the present invention.

Accordingly, the depth image generation unit 132 makes X' calculated according to Expression (2) maintain a state of increasing in order, and deletes any X' value unable to maintain the continuously increasing state. For example, FIG. 6B illustrates an example in which the depth image generation unit 132 deletes some coordinates as these and calculates the depth value. In FIG. 6B, 'o' indicates the coordinate and depth before interpolation, and '•' indicates the coordinate and depth after interpolation. As illustrated in FIG. 6B, X' proceeds to 53.81319, 54.81319, 55.81319, and 56.81319, and then, becomes 55.61538. Accordingly, 55.81319 and 56.81319, which are smaller than this 55.61538, are deleted and then, by using linear interpolation, depth values according to respective integer coordinate values are calculated, thereby obtaining a second depth image without distortion.

The intensity image generation unit 133 calculates intensity values corresponding to integer coordinates, from coordinates calculated by the coordinate calculation unit and intensity values according to these coordinates, and generates a second image which is an intensity image according to these calculated intensity values. In this case, the intensity image generation unit 133 can use an interpolation method by which the intensity values of coordinates closest to respective integer coordinates from among the coordinates calculated by the coordinate calculation unit 131 are taken as intensity values corresponding to the integer coordinates. Also, the intensity image generation unit 133 may use a linear interpolation method as the method of calculating the intensity values corresponding to the integer values.

However, if the second intensity image is thus obtained by the intensity image generation unit 133, by using all coordinates calculated by the coordinate calculation unit 131, distortion may occur in the intensity image. The reason for this is the same as the reason why distortion occurs in a depth image when the depth image generation unit 132 obtains a second depth image by using all coordinates. Accordingly, likewise, the intensity image generation unit 133 uses linear interpolation with only those coordinates making X' calculated by the coordinate calculation unit 131 maintain a state of increasing in order, thereby calculating intensity values corresponding to integer coordinates, and generating a second intensity image which is an intensity image without distortion according to these calculated intensity values.

The image matching unit 140 performs a function of matching each second depth image, which is a depth image transformed by the image transform unit 130, the second intensity image which is an intensity image transformed by the image transform unit 130, and a first color image which is a color image in which distortion is corrected by the distortion correction unit 130. The image matching unit 140 is formed with the resolution conversion unit 141, the edge detection unit 142, and the matching unit 143.

The resolution conversion unit 141 receives an input of a second depth image from the depth image generation unit 132, an input of a second intensity image from the intensity image generation unit 133, and an input of a first color image from the distortion correction unit 120.

Then, the resolution conversion unit 141 adjusts at least one of the second intensity image and the first color image so that the resolutions of the input second intensity image and the input first color image can match. More specifically, the resolution conversion unit 141 resamples at least one of the second intensity image and the first color image so that the resolutions of the input second intensity image and the input first color image can match, and outputs at least one of the resampled second intensity image and the resampled first color image. In this case, resampling may mean only interpolation or decimation or both interpolation and decimation. In particular, in the current embodiment, the resolution conversion unit 141 resamples the input intensity image, thereby matching the resolution of the second intensity image to the resolution of the first color image.

Also, the resolution conversion unit 141 adjusts at least one of the second depth image and the first color image so that the resolutions of the input second depth image and the input first color image can match. In particular, in the current embodiment, the resolution conversion unit 141 adjusts the resolution of the second depth image by using the same method as the method of resampling the second intensity image. That is, if the resolution conversion unit 141 performs interpolation by doubling the sampling frequency of the second intensity image, the resolution conversion unit 141 performs likewise interpolation, by doubling the sampling frequency of the second depth image, so that the resolutions of the second depth image and the first color image can match.

The edge detection unit 142 receives inputs of the second intensity image and the first color image from the resolution conversion unit 141, and detects one or more edges from this second intensity image, as first edges, and one or more edges from this first color image, as second edges. More specifically, the edge detection unit 142 detects points where rapid changes in intensity occur in the second intensity image, as the first edges, and similarly, detects points where rapid changes in color occur in the first color image, as the second edges.

The matching unit 143 makes the second intensity image and the first color image overlap so that the detected first and second edges can overlap to the maximum. Then, the matching unit 143 makes the second depth image and the first color image overlap as much as the second intensity image and the first color image overlap. In that state, the matching unit 143 matches pixels overlapping between the second depth image and the first color image.

Figure 7:
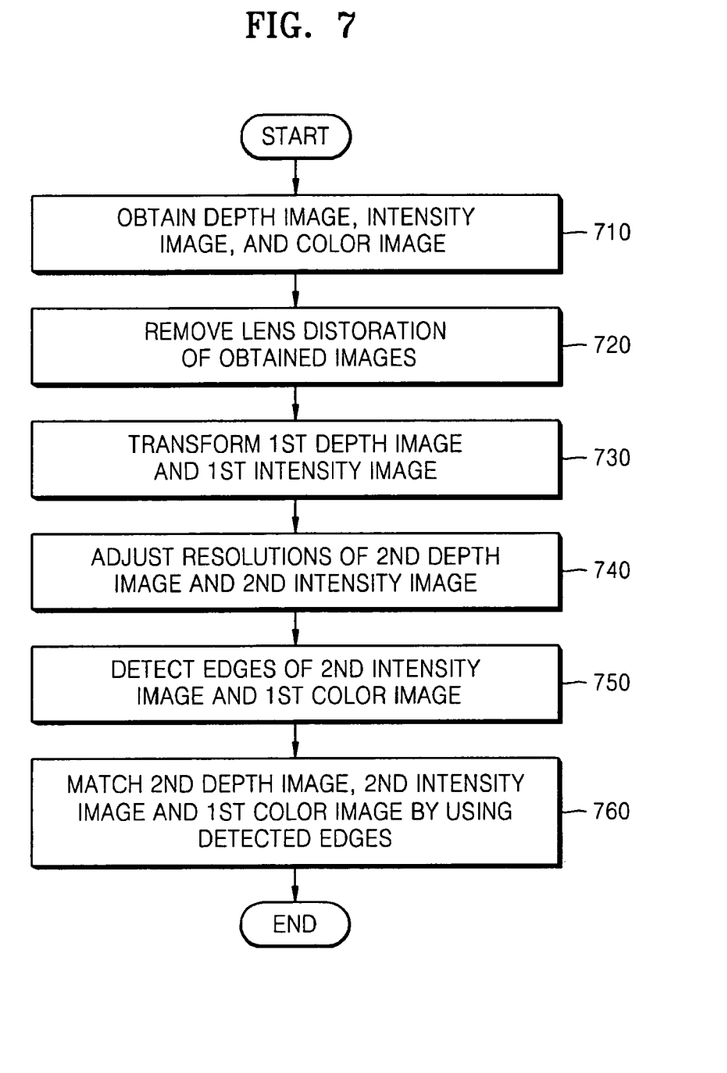
FIG. 7 is a flowchart illustrating operations of an image matching method according to an embodiment of the present invention.

FIG. 7 is a flowchart illustrating operations of an image matching method according to an embodiment of the present invention. Referring to FIG. 7, the image matching method according to the current embodiment is formed with operations processed in a series of time in the image matching apparatus illustrated in FIG. 1. Accordingly, though omitted hereinafter, an explanation on the image matching apparatus illustrated in FIG. 1 described above will be applied to the image matching method according to the current embodiment.

Referring to FIG. 7, the image matching apparatus obtains a depth image and an intensity image of an object by using a depth camera installed at a first position and obtains a color image of the object by using a color camera installed at a second position other than the first position, in operation 710.

In this case, the depth camera and the color camera are fixed such that these cameras form a straight line along a horizontal axis or a vertical axis. In particular, the current embodiment will be explained focusing on a case where the depth camera is positioned above the color camera in the vertical direction.

In operation 720, the image matching apparatus removes lens distortion existing in the depth image and the intensity image obtained by the depth image, in operation 710, and thus, corrects the depth image and the intensity image. Also, the image matching apparatus removes lens distortion existing in the color image obtained by the color camera, in operation 710, and thus, corrects for the color image. In this case, the lens distortion is distortion existing in the obtained images, and indicates distortion caused by lenses disposed on cameras. Hereinafter, a depth image, an intensity image and a color image obtained after distortion is corrected, and will be referred to as a first depth image, a first intensity image, and a first color image, respectively.

In operation 730, the image matching apparatus transforms the first depth image, which is a depth image in which distortion is corrected, in operation 720, into a depth image which could be obtained if the object were photographed by the depth camera at the second position which is the same position as that of the color camera. Also, the image matching apparatus transforms the first intensity image, which is an intensity image in which distortion is corrected, in operation 720, into an intensity image which could be obtained if the object were photographed by the depth camera at the second position which is the same position as that of the color camera. Hereinafter, the depth image and the intensity image transformed, in operation 730, will be referred to as a second depth image and a second intensity image, respectively.

In operation 740, the image matching apparatus adjusts at least one of the second intensity image, which is the intensity image transformed in operation 730, and the first color image, in which distortion is corrected in operation 720, so that the resolutions of the second intensity image and the first color image can match.

More specifically, the image matching apparatus resamples at least one of the second intensity image and the first color image so that the resolutions of the second intensity image and the first color image can match. In particular, in the current embodiment, by resampling the second intensity image, the resolution of the second intensity image is matched to the resolution of the first color image. Also, the image matching apparatus adjusts at least one of the second depth image, which is the depth image transformed in operation 730, and the first color image in which distortion is corrected in operation 720, so that the resolutions of the second depth image and the first color image can match. In particular, in the current embodiment, by resampling the second depth image with the same frequency as that for sampling the second intensity image, the resolution of the second depth image is matched to the resolution of the first color image.

In operation 750, the image matching apparatus detects one or more edges of the second intensity image adjusted in operation 740, as first edges, and detects one or more edges in the first color image in which distortion is corrected in operation 720, as second edges. More specifically, the image matching apparatus detects points where rapid changes in intensity occur in the second intensity image, as the first edges, and similarly, detects points where rapid changes in color occur in the first color image, as the second edges.

In operation 760, the image matching apparatus makes the second intensity image and the first color image overlap so that the detected first and second edges can overlap to the maximum. Then, the image matching apparatus makes the second depth image and the first color image overlap as much as the second intensity image and the first color image overlap, and in that state, the image matching apparatus matches pixels overlapping between the second depth image and the first color image.

Figure 8:
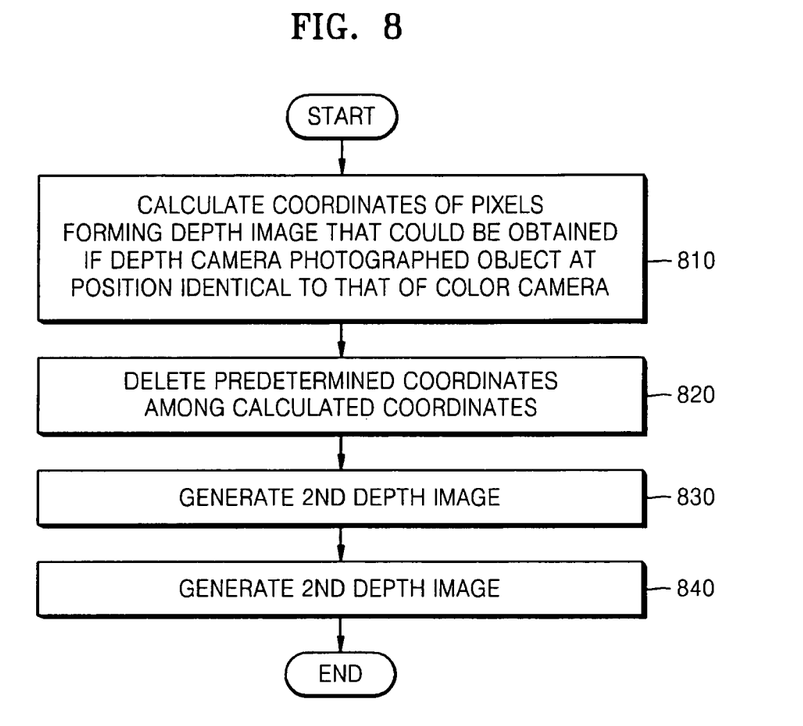
FIG. 8 is a detailed flowchart illustrating an operation for transforming a first depth image and a first intensity image in the image matching method illustrated in FIG. 7, according to an embodiment of the present invention.

FIG. 8 is a detailed flowchart illustrating operation 730 of FIG. 7, according to an embodiment of the present invention. Referring to FIG. 8, the image transform method according to the current embodiment is formed with operations processed in a series of time, in the image transform unit 130 illustrated in FIG. 1. Accordingly, though omitted hereinafter, an explanation on the image transform unit 130 illustrated in FIG. 1 and described above will be applied to the image transform method according to the current embodiment.

In operation 810, the image transform unit 130 calculates the coordinates of each of the pixels forming a depth image that could be obtained if the object were photographed by the depth camera 111 at the second position, from the coordinates of each of the pixels forming the first depth image. For example, when the depth values according to the coordinates of the pixels forming the first depth image are as illustrated in FIG. 5A, the image transform unit 130 calculates coordinates corresponding to the respective coordinates of pixels forming this first depth image, by using Expression (2) of Equation 1. The calculation result of using Expression (2) are as illustrated in FIG. 5B, and the calculated coordinates are smaller than the corresponding coordinates of pixels forming the first depth image.

In operation 820, the image transform unit 130 deletes coordinates that do not increase in order from among the coordinates calculated in operation 810. This is because the coordinates calculated in operation 810 decrease less when the point of the object is at a deeper position, and the distortion in the image occurs in the vicinity where the depth values of the object change.

In operation 830, the image transform unit 130 calculates depth values according to respective integer coordinates, by using linear interpolation with the coordinates that are not deleted, in operation 820, from among the coordinates calculated in operation 810 and the depth values corresponding to these coordinates, and generates a second depth image which is a depth image according to these calculated depth values.

In operation 840, the image transform unit 130 calculates intensity values according to respective integer coordinates, by using linear interpolation with the coordinates that are not deleted in operation 820, from among the coordinates calculated in operation 810 and the intensity values corresponding to these coordinates, and generates a second intensity image according to these calculated intensity values.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), for example. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Any narrowing or broadening of functionality or capability of an aspect in one embodiment should not considered as a respective broadening or narrowing of similar features in a different embodiment, i.e., descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. An image matching method comprising:
   obtaining a depth image and an intensity image of an object using a real depth camera installed at a first position with a first viewpoint and obtaining a color image of the object using a real color camera installed at a second position with a second viewpoint other than the first viewpoint;
   transforming each of the obtained depth image and the intensity image into a depth image and an intensity image, respectively, that could be obtained if the object were photographed by a camera at the second position with the second viewpoint; and
   matching the transformed depth image and intensity image with the obtained color image,
   wherein the transforming of the obtained depth image and intensity image comprises:
   calculating the coordinates of each pixel of the image that could be obtained if the object were photographed by a camera at the second position based on a distance between the first viewpoint and the second viewpoint, corresponding to each pixel forming the obtained depth image and intensity image, by using a depth value according to the obtained depth image.

2. The method of claim 1, wherein in the transforming of each of the obtained depth image and intensity image into a depth image and intensity image, the obtained depth image and intensity image are transformed into a depth image and intensity image, respectively, that could be obtained if the object were photographed by a camera at the second position, by using each of the pixels of the obtained depth image.

3. The method of claim 1, wherein the transforming of the obtained depth image and intensity image further comprises:

by using the calculated coordinates of each pixel, calculating the depth value and intensity value corresponding to each integer coordinate, and generating a depth image and intensity image according to the calculated depth values and intensity values, and thus transforming the obtained depth image and intensity image into the depth image and intensity image, respectively, that could be obtained if the object were photographed by a camera at the second position.

4. The method of claim 1, wherein the matching of the transformed depth image and intensity image and the obtained color image comprises:

adjusting the transformed depth image and intensity image so that the resolutions of the transformed depth image, and intensity image and the obtained color image can match;

detecting at least one or more first edges in the adjusted intensity image, and detecting at least one or more second edges in the obtained color image; and performing the matching, by making the adjusted intensity image and the obtained color image overlap so that the detected first edges and second edges can overlap, and making the adjusted depth image and the obtained color image overlap as much as the intensity image and the color image overlap.

5. A non-transitory computer readable recording medium having embodied thereon a computer program for executing the method of claim 1.

6. The image matching method of claim 1, wherein the transforming of the obtained depth image comprises calculating new coordinates of each of the pixels forming the obtained depth image, such that the new coordinates form a new depth image with the second viewpoint.

7. An image matching method comprising:

obtaining a depth image and an intensity image of an object using a depth camera installed at a first position and a color image of the object using a color camera installed at a second position other than the first position;

transforming the obtained depth image and intensity image into a depth image and an intensity image, respectively, that could be obtained if the object were photographed by a camera at the second position; and matching the transformed depth image and intensity image and the obtained color image, wherein the transforming of the obtained depth image and intensity image comprises:

calculating the coordinates of each pixel of the image that could be obtained if the object were photographed by a camera at the second position, corresponding to each pixel forming the obtained depth image and intensity image, by using the depth value according to the obtained depth image; and by using the calculated coordinates of each pixel, calculating the depth value and intensity value corresponding to each integer coordinate, and generating a depth image and intensity image according to the calculated depth values and intensity values, and thus transforming the obtained depth image and intensity image into the depth image and intensity image, respectively, that could be obtained if the object were photographed by a camera at the second position, wherein in the generating of the depth image and intensity image, the depth value corresponding to each integer coordinate is calculated by using coordinates of a predetermined number of pixels from among the calculated pixels, and a depth image is generated according to the calculated depth values, and the intensity value corresponding to each integer coordinate is calculated by using coordinates of a predetermined number of pixels from among the calculated pixels, and an intensity image is generated according to the calculated intensity values.

8. An image matching apparatus comprising:

a real depth camera installed at a first position with a first viewpoint so as to obtain a depth image and an intensity image of an object;

a real color camera installed at a second position with a second viewpoint other than the first viewpoint so as to obtain a color image of the object;

an image transform unit transforming each of the obtained depth image and intensity image into a depth image and intensity image, respectively, that could be obtained if the object were photographed by a camera at the second position with the second viewpoint; and an image matching unit matching the transformed depth image and intensity image and the obtained color image, wherein the image transform unit comprises:

a coordinate calculation unit calculating the coordinates of each pixel of the image that could be obtained if the object were photographed by a camera at the second position based on a distance between the first viewpoint and the second viewpoint, corresponding to each pixel forming the obtained depth image and intensity image, by using a depth value according to the obtained depth image.

9. The apparatus of claim 8, wherein the image transform unit transforms the obtained depth image and intensity image into a depth image and intensity image, respectively, that could be obtained if the object were photographed by a camera at the second position, by using each pixel of the obtained depth image.

10. The apparatus of claim 8, wherein the image transform unit further comprises:

a depth image/intensity image generation unit, by using the calculated coordinates of each pixel, calculating the depth value and intensity value corresponding to each integer coordinate, and generating a depth image and intensity image according to the calculated depth values and intensity values.

11. The apparatus of claim 8, wherein the image matching unit comprises:

a resolution conversion unit adjusting the transformed depth image and intensity image so that the resolutions of the transformed depth image, and intensity image and the obtained color image can match;

an edge detection unit detecting at least one or more first edges in the adjusted intensity image, and detecting at least one or more second edges in the obtained color image; and a matching unit performing the matching, by making the adjusted intensity image and the obtained color image overlap so that the detected first edges and second edges can overlap, and making the adjusted depth image and the obtained color image overlap as much as the intensity image and the color image overlap.

12. The apparatus of claim 8, wherein the image transform unit transforms the obtained depth image by calculating new coordinates of each of the pixels forming the obtained depth image, such that the new coordinates form a new depth image with the second viewpoint.

13. An image matching apparatus comprising:
- a depth camera installed at a first position so as to obtain a depth image and an intensity image of an object;
- a color camera installed at a second position other than the first position so as to obtain a color image of the object;
- an image transform unit transforming the obtained depth image and intensity image into a depth image and intensity image, respectively, that could be obtained if the object were photographed by a camera at the second position; and
- an image matching unit matching the transformed depth image and intensity image and the obtained color image, wherein the image transform unit transforms the obtained depth image and intensity image into a depth image and intensity image, respectively, that could be obtained if the object were photographed by a camera at the second position, by using a depth value according to the obtained depth image, wherein the image transform unit comprises:
- a coordinate calculation unit calculating the coordinates of each pixel of the image that could be obtained if the object were photographed by a camera at the second position, corresponding to each pixel forming the obtained depth image and intensity image, by using the depth value according to the obtained depth image; and
- a depth image/intensity image generation unit, by using the calculated coordinates of each pixel, calculating the depth value and intensity value corresponding to each integer coordinate, and generating a depth image and intensity image according to the calculated depth values and intensity values, wherein the depth image/intensity image generation unit calculates the depth value corresponding to each integer coordinate by using coordinates of a predetermined number of pixels from among the calculated pixels, and generates a depth image according to the calculated depth values, and calculates the intensity value corresponding to each integer coordinate by using coordinates of a predetermined number of pixels from among the calculated pixels, and generates an intensity image according to the calculated intensity values.

* * * * *